United States Patent
Libal et al.

(10) Patent No.: US 12,424,116 B2
(45) Date of Patent: Sep. 23, 2025

(54) FALSE TARGET DETECTION FOR AIRPORT TRAFFIC CONTROL

(71) Applicant: Honeywell International Inc., Charlotte, NC (US)

(72) Inventors: Vit Libal, Charlotte, NC (US); YuShin Jun, Charlotte, NC (US); Maksood Moidin Kadike, Charlotte, NC (US); Kameswararao Belamkonda, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 309 days.

(21) Appl. No.: 17/649,284

(22) Filed: Jan. 28, 2022

(65) Prior Publication Data

US 2022/0246047 A1 Aug. 4, 2022

(30) Foreign Application Priority Data

Feb. 2, 2021 (IN) .............................. 202111004542

(51) Int. Cl.
*G08G 5/72* (2025.01)
*G06V 10/84* (2022.01)
*G06V 20/54* (2022.01)
*G08G 5/22* (2025.01)

(52) U.S. Cl.
CPC ............. *G08G 5/727* (2025.01); *G06V 10/85* (2022.01); *G06V 20/54* (2022.01); *G08G 5/22* (2025.01); *G06V 2201/07* (2022.01)

(58) Field of Classification Search
None
See application file for complete search history.

(56) References Cited

U.S. PATENT DOCUMENTS

| 6,069,581 | A | 5/2000 | Bell et al. | |
|---|---|---|---|---|
| 8,737,684 | B2* | 5/2014 | Meloche | G08G 5/0082 382/103 |
| 2004/0189521 | A1* | 9/2004 | Smith | G08G 5/727 342/465 |
| 2010/0265120 | A1* | 10/2010 | Drake | G01S 7/41 342/36 |

(Continued)

OTHER PUBLICATIONS

Pack, Kenneth, "Automated False Track Identification", Jul. 16, 2007, IEEE (Year: 2007).*

(Continued)

*Primary Examiner* — Todd Melton
*Assistant Examiner* — Sarah A. Mueller
(74) *Attorney, Agent, or Firm* — Brooks, Cameron & Huebsch, PLLC (57) ABSTRACT

Methods, devices, and systems for false target detection for airport traffic control are described herein. One device includes a user interface, a memory, and a processor configured to execute executable instructions stored in the memory to receive one or more sensor reports from one or more sensors, aggregate data that corresponds to a particular target from the one or more sensor reports, determine the particular target is a false target responsive to only one of the sensor reports including data that corresponds to the particular target, and display the particular target as a false target on the user interface responsive to determining the particular target is a false target.

16 Claims, 9 Drawing Sheets

(56) References Cited

U.S. PATENT DOCUMENTS

2021/0302537 A1* 9/2021 Schlehuber ........... G01S 13/723
2023/0360247 A1* 11/2023 Chew ..................... H04N 23/11

OTHER PUBLICATIONS

Kuo, Yu-Hsuan et al., "Detecting Outliers in Data with Correlated Measures", Aug. 26, 2018, arXiv (Year: 2018).*
Extended European Search Report for related European Application No. 22153392.0, mailed May 17, 2022 (8 pgs).

* cited by examiner

FALSE TARGET DETECTION FOR AIRPORT TRAFFIC CONTROL

CROSS-REFERENCE TO RELATED APPLICATIONS

This application claims priority pursuant to 35 U.S.C. 119(a) to India Patent Application No. 202111004542, filed Feb. 2, 2021, which application is incorporated herein by reference in its entirety.

TECHNICAL FIELD

The present disclosure relates to methods, devices, and systems for false target detection for airport traffic control.

BACKGROUND

Air traffic control (ATC) at an airport can direct aircraft in the air and on the ground in an airport. Directing aircraft on the ground can prevent collisions between aircraft, organize and expedite aircraft traffic, and provide information and/or support for aircraft pilots.

A tracking system can provide locations of targets (e.g., aircrafts and/or vehicles) at the airport and a user interface can display the locations of the targets on a map of the airport to assist ATC controllers in directing targets around the airport. Often, tracking systems can include false targets (e.g., non-existent aircrafts and/or vehicles) created by sensor errors. For example, false targets can be produced due to a wireless signal reflection from an airport building. Having false targets displayed on an airport map can further complicate decisions made by ATC controllers, leading to safety issues and delays for passengers and/or airlines.

DETAILED DESCRIPTION

Methods, devices, and systems for false target detection for airport traffic are described herein. For example, an embodiment includes a user interface, a memory, and a processor configured to execute executable instructions stored in the memory to receive one or more sensor (e.g., position) reports from one or more sensors, aggregate data that corresponds to a particular target from the one or more sensor reports, determine the particular target is a false target responsive to only one of the sensor reports including data that corresponds to the particular target, and display the particular target as a false target on the user interface responsive to determining the particular target is a false target. In some examples, detecting the false targets and removing the false targets can mitigate their impact on an output of a tracking system. For example, when a false target is detected, it can be withheld from further calculation of aggregated tracks and/or the false target can be displayed differently than valid targets.

False target detection, in accordance with the present disclosure, can include determining and notifying an ATC controller whether a target is a false target to assist the ATC controller in making decisions based on valid (e.g., real) targets. As used herein, an ATC controller can be a user (e.g., a person) associated with the airport operator or air navigational service provider entrusted with the responsibility of providing ground and air traffic services to aircraft and/or other vehicles. An airport can include multiple ATC controllers, who can view a map of the airport including targets on a display. Presenting a map of the airport with false targets marked or hidden can allow an ATC controller to quickly view and analyze ground traffic, make routing decisions, and communicate the decisions to various targets.

When, for example, a wireless sensor produces a report of a non-existent target, the false target can be marked in a distinctive way so that an ATC controller can be made aware (e.g., alerted, warned, etc.) of the false target. The ATC controller can then hide and/or ignore the false target on the display and make more informed (e.g., based on valid targets) ground traffic decisions to provide safer and more efficient flow of ground traffic and reduce delays for passenger and/or airlines.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 226 may reference element "26" in FIG. 2, and a similar element may be referenced as 426 in FIG. 4.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "X" as used herein, particularly with respect to reference numerals in the drawings, indicate that a number of the particular feature so designated can be included with some embodiments of the present disclosure. This number may be the same or different between designations.

Figure 1:
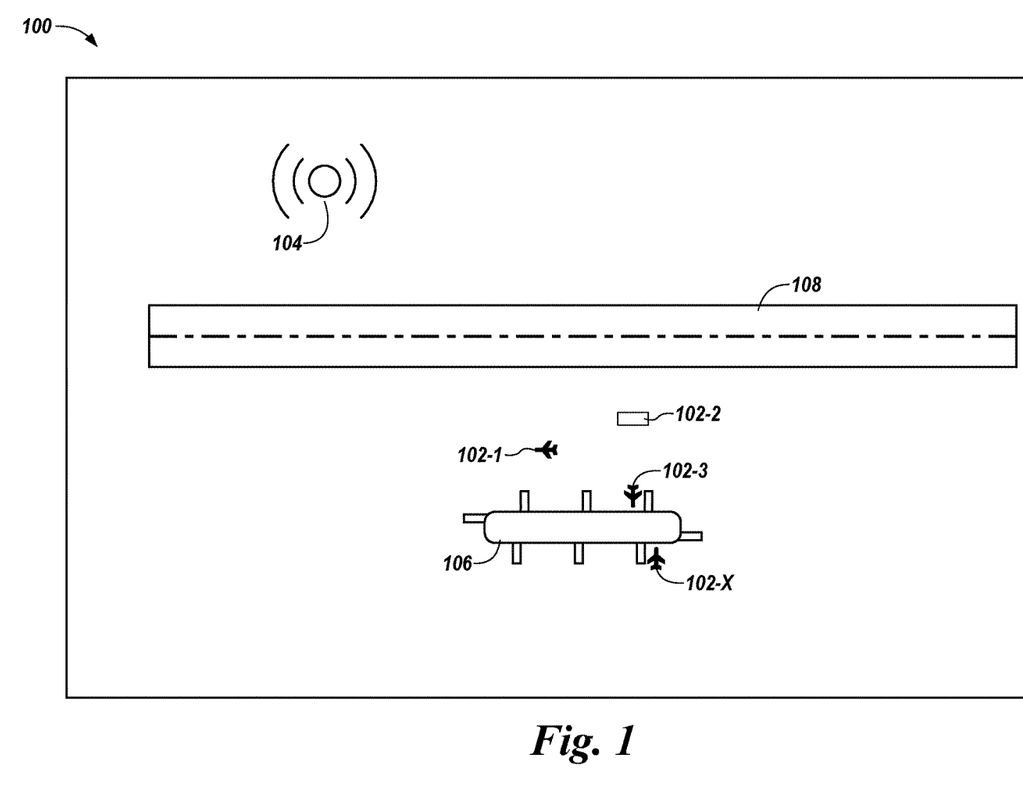
FIG. 1 illustrates an example of a plurality of targets at an airport in accordance with an embodiment of the present disclosure.

FIG. 1 illustrates an example of a plurality of targets 102-1, 102-2, 102-3, . . . , 102-X at an airport 100 in accordance with an embodiment of the present disclosure. The airport 100 can further include a sensor 104, a building 106, and a runway 108.

Building 106 can be an airplane hangar, an ATC tower, a gate, a security checkpoint, or an airport terminal, for example. The targets 102-1, 102-2, 102-3, . . . , 102-X can taxi (e.g., travel) between building 106 and runway 108 and can take off and/or land using runway 108. Although one building 106 and one runway 108 are illustrated in FIG. 1 for simplicity and so as not to obscure embodiments of the present disclosure, airport 100 can include any number of buildings and any number of runways.

Targets 102-1, 102-2, 102-3, . . . , 102-X can be aircrafts and/or vehicles at the airport 100. Each of the targets (e.g., the position of the targets) can be tracked using sensors included in the targets 102-1, 102-2, 102-3, . . . , 102-X and/or sensors that are external to the targets 102-1, 102-2, 102-3, . . . , 102-X. Each of the sensors can detect targets using a different physical process or different parameter settings.

Figure 6:
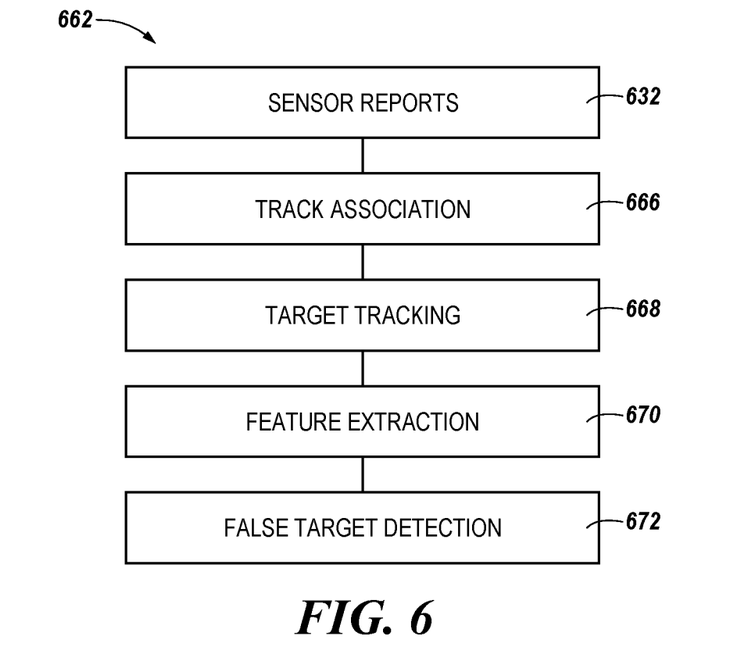
FIG. 6 illustrates an example flow diagram associated with a false target detection method in accordance with an embodiment of the present disclosure.
Figure 9:
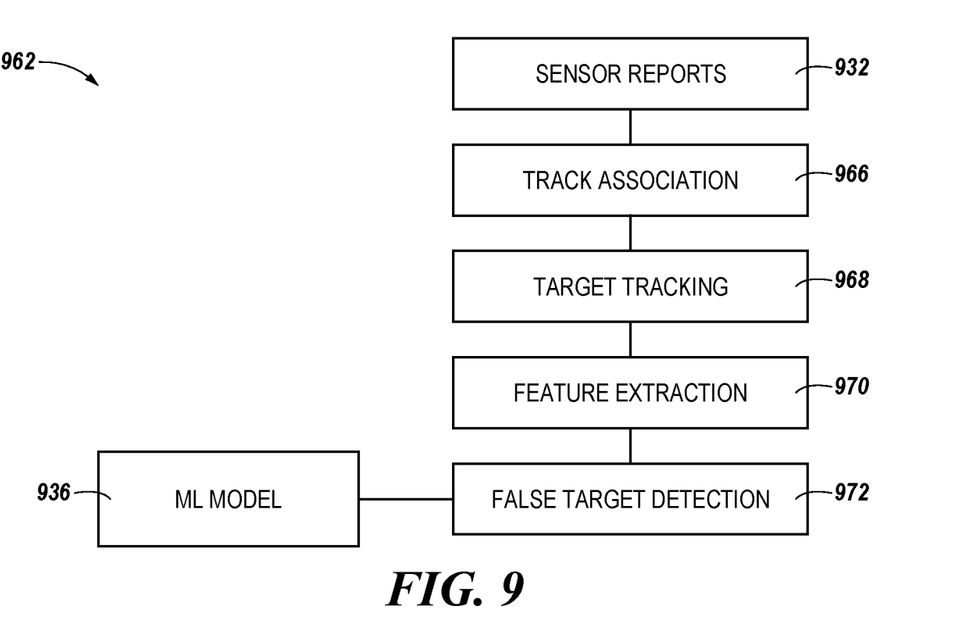
FIG. 9 illustrates an example flow diagram associated with false target detection in accordance with an embodiment of the present disclosure.

In a number of embodiments one or more of the targets 102-1, 102-2, 102-3, . . . , 102-X can include a global positioning system (GPS) transponder. The GPS transponder can send a sensor report (e.g., sensor reports 332, 632, and 932 in FIGS. 3, 6, and 9, respectively) after a particular period of time has elapsed since previously sending a sensor report or in response to detecting a change in position of a target of the plurality of targets 102-1, 102-2, 102-3, . . . , 102-X.

Sensor 104 can be an external sensor for tracking (e.g., detecting the position of) one or more of the targets 102-1, 102-2, 102-3, . . . , 102-X. For example, sensor 104 can be on the ground or attached to a building, a pole, a tower, or a stand. Although one sensor 104 is illustrated in FIG. 1 for simplicity and so as not to obscure embodiments of the present disclosure, airport 100 can include any number of sensors located at different locations throughout airport 100.

In some examples, the sensor 104 can be radar or an antenna used for multilateration or two-dimensional position location. The sensor 104 can send a sensor report after a particular period of time has elapsed since previously sending a sensor report or in response to detecting a change in position of one of the plurality of targets 102-1, 102-2, 102-3, . . . , 102-X. For example, the sensor 104 can send a sensor report twice per second.

Figure 2:
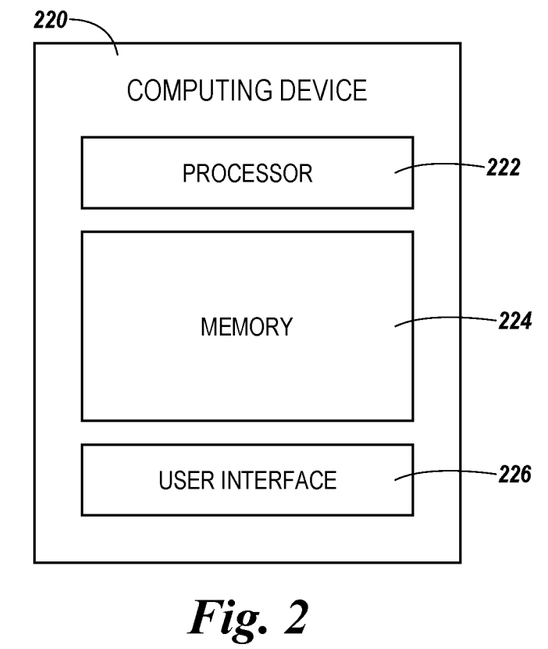
FIG. 2 illustrates an example of a computing device for false target detection in accordance with an embodiment of the present disclosure.

FIG. 2 illustrates an example of a computing device 220 for false target detection in accordance with an embodiment of the present disclosure. The computing device 220 can be, for example, a laptop computer, a desktop computer, a mobile device, and/or redundant combinations thereof, among other types of computing devices. The computing device 220 can be located at the airport in an air traffic control room and/or tower, for example. As illustrated in FIG. 2, the computing device 220 can include a processor 222, a memory 224, and a user interface 226.

The memory 224 can be any type of storage medium that can be accessed by the processor 222 to perform various examples of the present disclosure. For example, the memory 224 can be a non-transitory computer readable medium having computer readable instructions (e.g., computer program instructions) stored thereon that are executable by the processor 222 to receive, via a network, one or more sensor reports (e.g., sensor reports 332, 632, and 932 in FIGS. 3, 6, and 9, respectively) from one or more sensors (e.g., sensor 104 previously described in connection with FIG. 1), aggregate data that corresponds to a particular target (e.g., of targets 102-1, 102-2, 102-3, . . . , 102-X previously described in connection with FIG. 1) from the one or more sensor reports, determine the particular target is a false target responsive to only one of the sensor reports including data that corresponds to the particular target, and display (e.g., to a user of computing device 220, such as an ATC controller) the particular target as a false target on the user interface 226 responsive to determining the particular target is a false target. A false target can be a representation of a non-existent aircraft and/or vehicle created by sensor errors.

The networks described herein can be a network relationship through which the one or more sensors and the computing device 220 communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from and transmit information to the one or more sensors and the computing device 220 via a wired or wireless network.

As used herein, a "network" can provide a communication system that directly or indirectly links two or more computers and/or peripheral devices and allows a computing device 220 to access data and/or resources on a sensor and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

The aggregated data can include a target identification (ID) for the particular target, a position of the particular target, a position measurement time, a velocity of the particular target, and other information related to the particular target. The data can be aggregated from one or more preceding sensor reports and/or current sensor reports. For example, the memory 224 can include computer readable instructions executable by the processor 222 to store one or more preceding sensor reports from a sensor in memory 224, receive a current sensor report from the sensor, aggregate data, via track association (e.g., track association 666, 766, 866, and 966 in FIGS. 6, 7, 8, and 9, respectively), that corresponds to a particular target at an airport from the one or more preceding sensor reports and the current sensor report, determine the particular target is a false target via a false target detection method (e.g., false target detection method 662 in FIGS. 6 and 962 in FIG. 9), responsive to only one of the one or more preceding sensor reports and the current sensor report including data that corresponds to the particular target, and display a map of the airport without the particular target on a user interface 226 responsive to determining the particular target is a false target.

In some examples, a false target can be determined, via the false target detection method, if the current sensor report is inconsistent with one or more of the preceding sensor reports. In some examples, computer readable instructions can be executable by the processor 222 to determine the particular target is a false target responsive to the current sensor report including a position of the particular target that is inconsistent with a position of the particular target included in the one or more preceding sensor reports. The position of the particular target included in the current sensor report can be inconsistent with the position of the particular target included in the one or more preceding sensor reports responsive to a difference between the position of the particular target included in the current sensor report and the position of the particular target included in the one or more preceding sensor reports being greater than an expected error value. For example, the expected error value could be 20 meters or less from the preceding sensor report position and the current sensor report could include a position of the particular target at 50 meters from the preceding sensor report position. Accordingly, the particular target could be a false target because the position of the target in the current sensor report is inconsistent with the position of the particular target included in the preceding sensor report.

Figure 10:
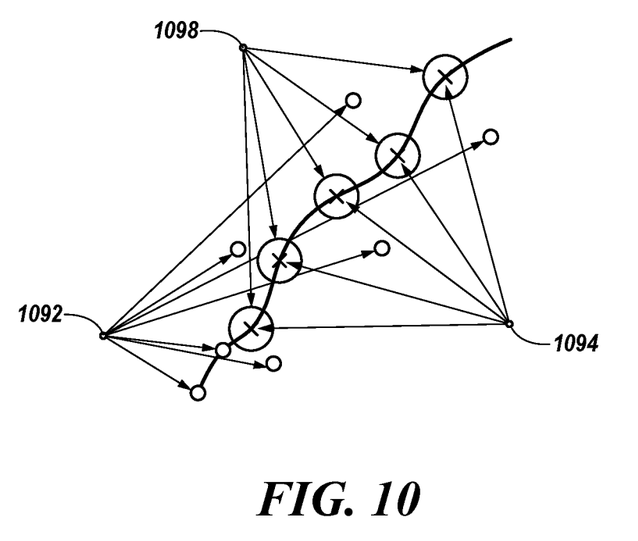
FIG. 10 illustrates an example of expected target position error values surrounding estimated target positions and sensor report target positions in accordance with an embodiment of the present disclosure.

As illustrated in FIG. 10, expected target position error values (e.g., expected target position error values 1098 in FIG. 10) of 20 meters, for example, can surround estimated target positions (e.g., estimated target positions 1094 in FIG. 10). A current sensor report can include sensor report target positions (e.g., sensor report target positions 1092 in FIG. 10) that are further than 50 meters, for example, from the estimated target positions estimated for the time of the current sensor report. Accordingly, the particular target could be determined by the false target detection method to be a false target because a sensor report target position is inconsistent with an estimated target position or is inconsistent with a sensor report target position of a preceding sensor report.

Figure 7:
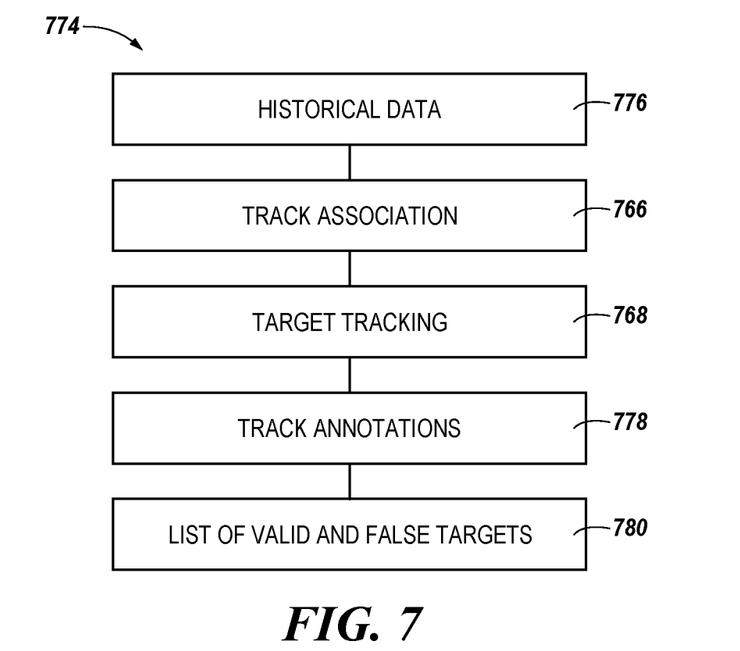
FIG. 7 illustrates an example flow diagram associated with a method of creating a list of valid and false targets in accordance with an embodiment of the present disclosure.
Figure 8:
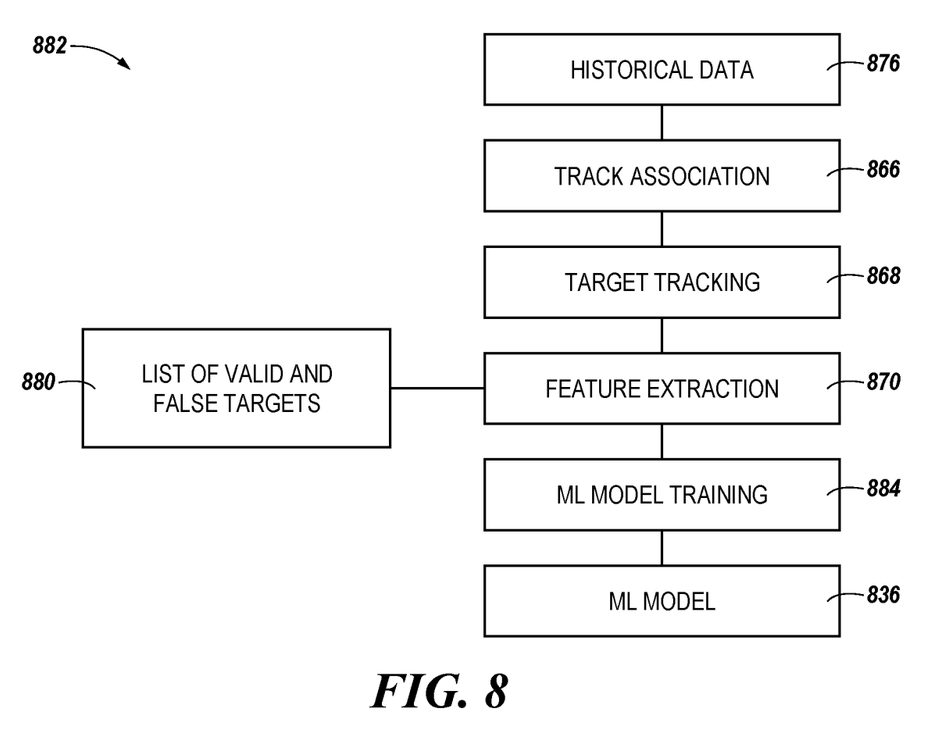
FIG. 8 illustrates an example flow diagram associated with a method to calculate a machine learning model in accordance with an embodiment of the present disclosure.

The expected target position error value can be determined using historical data (e.g., historical data 776 and 876 in FIG. 7 and FIG. 8, respectively. Historical data can be a set of previously collected sensor reports. The expected target position error values can be determined by extracting positions of valid targets from sensor reports, calculating a position error estimate for all target positions, estimating a probability distribution of a position error using a set of all position error estimates and establishing the expected target position error value as the mean value of an estimated distribution. The position error value can be determined as a distance between the sensor report target position contained in a sensor report and an estimated target position determined by target tracking (e.g., target tracking 668, 768, 868, and 968 in FIGS. 6, 7, 8, and 9, respectively). In some examples, Kalman Filtering, Particle Filtering, and/or other methods can be used in target tracking.

Figure 11:
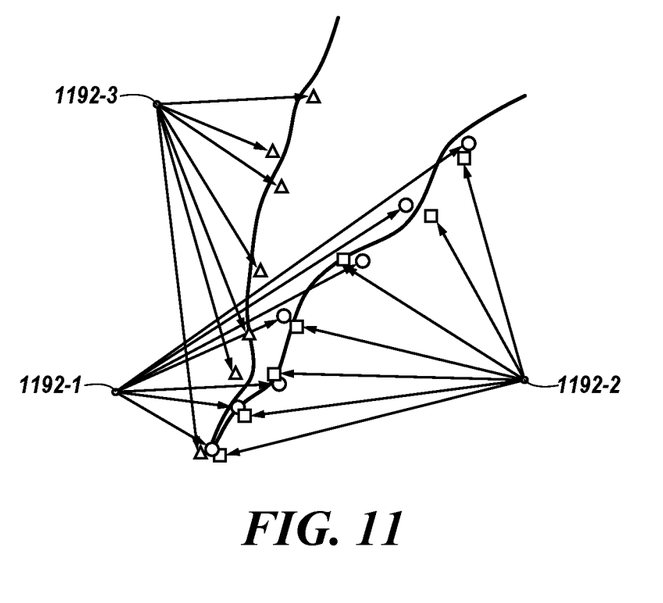
FIG. 11 illustrates an example of sensor report target positions in accordance with an embodiment of the present disclosure.

In a number of embodiments, a false target can be determined by the false target detection method if the current sensor report of a sensor is inconsistent with a sensor report of a different sensor. For example, computer readable instructions can be executable by the processor 222 to perform the false target detection method to determine the particular target is a false target responsive to sensor reports including a sensor report target position (e.g., sensor report target position 1192-3 in FIG. 11) that is inconsistent with sensor report target positions (e.g., sensor report target positions 1192-1 and 1192-2 in FIG. 11) included in sensor reports of one or more different sensors.

A number of sensors can be simultaneously reporting on a particular target. Computer readable instructions can be executable by the processor 222 to determine which sensor reports are reporting on the same particular target by track association. The track association method can be, for example, Nearest Neighbor, Global Nearest Neighbor, and/or Multiple Hypothesis tracking.

A consistency score can be calculated for each sensor report. One or more features can be extracted from the sensor report by a feature extraction method (e.g., feature extraction 670, 870, and 970 in FIGS. 6, 8, and 9, respectively). The one or more features can include a duration of a target track since its initiation, a combination of other sensors that are simultaneously reporting on the same target, estimated speed of a target, target movement type, target type, estimated position errors, estimated velocity errors, and/or an identifier of an airport area that contains a target's position. An estimated position error can be a distance of a sensor report target position from an estimated target position estimated by target tracking. An estimated velocity error can be a difference between a velocity of the target as reported by a sensor report and a velocity estimated by target tracking, where target tracking can be and/or include Kalman Filtering, Particle Filtering, and/or other methods.

In a number of embodiments, the false target detection (e.g., false target detection 672 and 972 in FIGS. 6 and 9, respectively) can be and/or include a lookup table. The lookup table can include various consistency score values for combinations of one or more extracted features. The consistency score can be compared with a pre-determined consistency threshold. Sensor reports with consistency scores lower than the pre-determined consistency threshold can be marked as false and sensor reports with consistency scores greater than the pre-determined threshold can be marked as valid. A false target can be identified using a distinctive value in a specific data field and a valid target can be identified using a different distinctive value in the specific data field. One or more pre-determined consistency thresholds and/or one or more distinctive values can be stored in, for example, memory 224.

Track annotation (e.g., track annotation 778 in FIG. 7) can be performed to enable use of supervised machine learning methods for false track detection as a part of a method to create a list of valid and false targets (e.g., method to create a list of valid and false targets 774 in FIG. 7). Sensor reports are extracted from historical data and aggregated to form tracks corresponding to likely targets by track association and filtered by the target tracking method. The targets corresponding to resulting tracks can then be annotated either as false or as valid targets in a track annotation step.

Track annotations can be made by a human observer with knowledge of the airport and/or knowledge of the sensors. In a number of embodiments, camera footage of the airport recorded during collection of the historical data can be used and the target annotation can be automated by detecting an aircraft in the camera footage using an object detection method and by resolving correspondence between the detected aircraft and a target's track obtained from target tracking. Resulting track annotations can be stored in memory as a list of valid and false tracks (e.g., list of valid and false tracks 780 in FIGS. 7 and 880 in FIG. 8) that refer to the target tracks contained in the historical data and obtained by track association and target tracking.

Historical data can be collected during normal operation of the tracking system. The historical data can be used for analysis of various characteristics, such as, expected sensor error estimation or target motion patterns. The historical data can be stored in memory 224 and can include sensor reports collected over a previous period of time.

One or more features as described above can be extracted from the sensor reports contained in historical data by feature extraction. Additional summarizing quantities can be calculated from the historical data by feature extraction. These summarizing quantities can include a relative frequency of occurrence of false targets, positions or areas of frequent occurrence of false targets, relative frequency of occurrence of valid targets given a target movement type, and/or relative frequency of occurrence of valid targets given a reporting sensor.

The one or more features and one or more summarizing quantities calculated by feature extraction can be used in a method (e.g., method 882 in FIG. 8) to calculate the machine learning model (e.g., machine learning model 336, 836 and 936 in FIGS. 3, 8, and 9, respectively) by the machine learning model training (e.g., machine learning model training 884 in FIG. 8). Machine learning model training can be and/or include one or more machine learning methods including, but not limited to, a Gaussian Mixture Model (GMM), a Hidden Markov Model (HMM), deep neural networks, a support vector machine (SVM), and/or a decision tree.

The false track detection method can use a two state Hidden Markov Model as a machine learning model. The two state Hidden Markov Model can recursively update a consistency score as a cumulative log-likelihood of an occurrence of a false target state or a valid target state given values of extracted features. A cumulative log-likelihood of an occurrence of a false target or a valid target given values of extracted features can be obtained by summing a trained value of a log-likelihood of a transition between states with the trained value of log-likelihood of observation of the values of extracted features given the state.

In some examples, an automated routing system used to propose optimal routes for targets moving throughout the airport can use the false target detection. For example, computer readable instructions can be executable by the processor 222 to determine a particular route at the airport for an aircraft responsive to determining a particular target is a false target.

The memory 224 can be volatile or nonvolatile memory. The memory 224 can also be removable (e.g., portable) memory, or non-removable (e.g., internal) memory. For example, the memory 224 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 224 is illustrated as being located within computing device 220, embodiments of the present disclosure are not so limited. For example, memory 224 can also be located internal to another computing resource (e.g., enabling computer readable instructions to be downloaded over the Internet or another wired or wireless connection).

As illustrated in FIG. 2, computing device 220 includes a user interface 226. For example, the user interface 226 can display an airport map including a plurality of targets on a display. A user (e.g., operator) of computing device 220, such as an ATC controller, can interact with computing device 220 via user interface 226. For example, user interface 226 can provide (e.g., display and/or present) information to the user of computing device 220, and/or receive information from (e.g., input by) the user of computing device 220. For instance, in some embodiments, user interface 226 can be a graphical user interface (GUI) that can provide and/or receive information to and/or from the user of computing device 220. The display can be, for instance, a touch-screen (e.g., the GUI can include touch-screen capabilities). Alternatively, a display can include a television, computer monitor, mobile device screen, other type of display device, or any combination thereof, connected to computing device 220 and configured to receive a video signal output from the computing device 220.

In a number of embodiments, a false target can be displayed differently than a valid target on user interface 226, as will be further described in connection with FIG. 4. For example, computer readable instructions can be executable by the processor 222 to display the false target in a particular color (e.g., a color that is different than the color in which a valid target is displayed) on user interface 226.

In a number of embodiments, a particular target can be determined to be a valid target (e.g., real). For example, computer readable instructions can be executable by the processor 222 to determine a particular target is a valid target responsive to a plurality of the one or more preceding sensor reports and the current sensor report including data that corresponds to the particular target and display the map of the airport with the particular target on the user interface 226 responsive to determining the particular target is a valid target.

Figure 3:
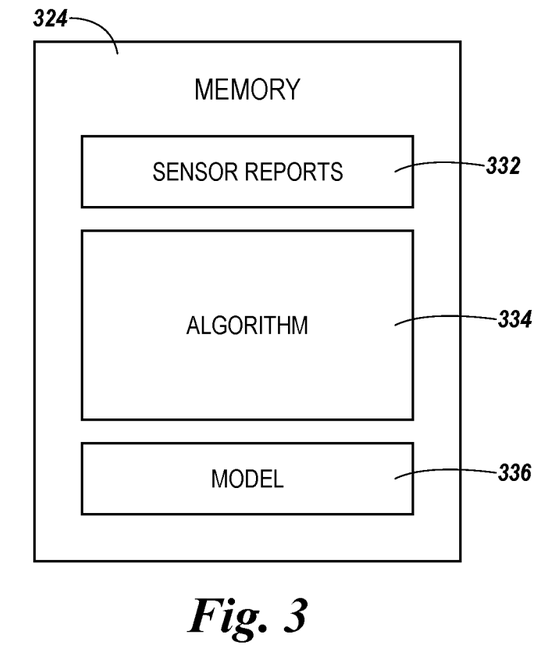
FIG. 3 illustrates an example of a memory to store sensor reports, an algorithm, and a model for use in false target detection in accordance with an embodiment of the present disclosure.

FIG. 3 illustrates an example of a memory 324 to store sensor reports 332, an algorithm 334, and a model 336 for use in false target detection in accordance with an embodiment of the present disclosure. Memory 324 can correspond to memory 224 in FIG. 2.

As previously described, sensor reports 332 can be sent from one or more sensors and can be stored in memory 324. In some examples, the memory 324 can store one or more preceding sensor reports and/or a current sensor report. For example, the memory 324 can store the sensor report immediately preceding the current sensor report to compare the current sensor report to. As new sensor reports are stored in memory 324, older sensor reports can be removed from memory 324. The sensor reports 332 can include a target ID for a particular target, a position of the particular target, a position measurement time, a velocity of the particular target, and/or an expected error value for the position of the particular target.

Algorithm 334 can be generated using historical data (e.g., historical data 776 and 876 in FIG. 7 and FIG. 8, respectively) stored in memory 324. Historical data can include target position data, shape of target data, weather data, size of target data, type of target data, type of sensor, and/or airport area data. Position data, for example, can include position data of one or more false targets and position data of one or more valid targets and size data, for example, can include size of one or more false targets and size of one or more valid targets.

One or more measurements can be outputted from the algorithm 334. The measurements can include a relative frequency of false targets, relative frequency of valid targets, relative positions of false targets, relative positions of valid targets, relative velocities of false targets, relative velocities of valid targets, relative frequency of false targets based on target type, relative frequency of valid targets based on target type, relative frequency of false targets based on target movement type, relative frequency of valid targets based on target movement type, relative frequency of false targets based on reports given by other sensors, relative frequency of valid targets based on reports given by other sensors, relative expected position errors of false targets, or relative expected position errors of valid targets for each of the one or more sensors.

The one or more measurements from algorithm 334 can be inputted into model 336. Model 336 can be a machine learning model used to determine whether a target is a false target or a valid target. The model 336 can use one or more pattern detection methods including, but not limited to, a Gaussian Mixture Model (GMM), a Hidden Markov Model (HMM), deep neural networks, a signal multivector (SMV), and/or a decision tree.

Figure 4:
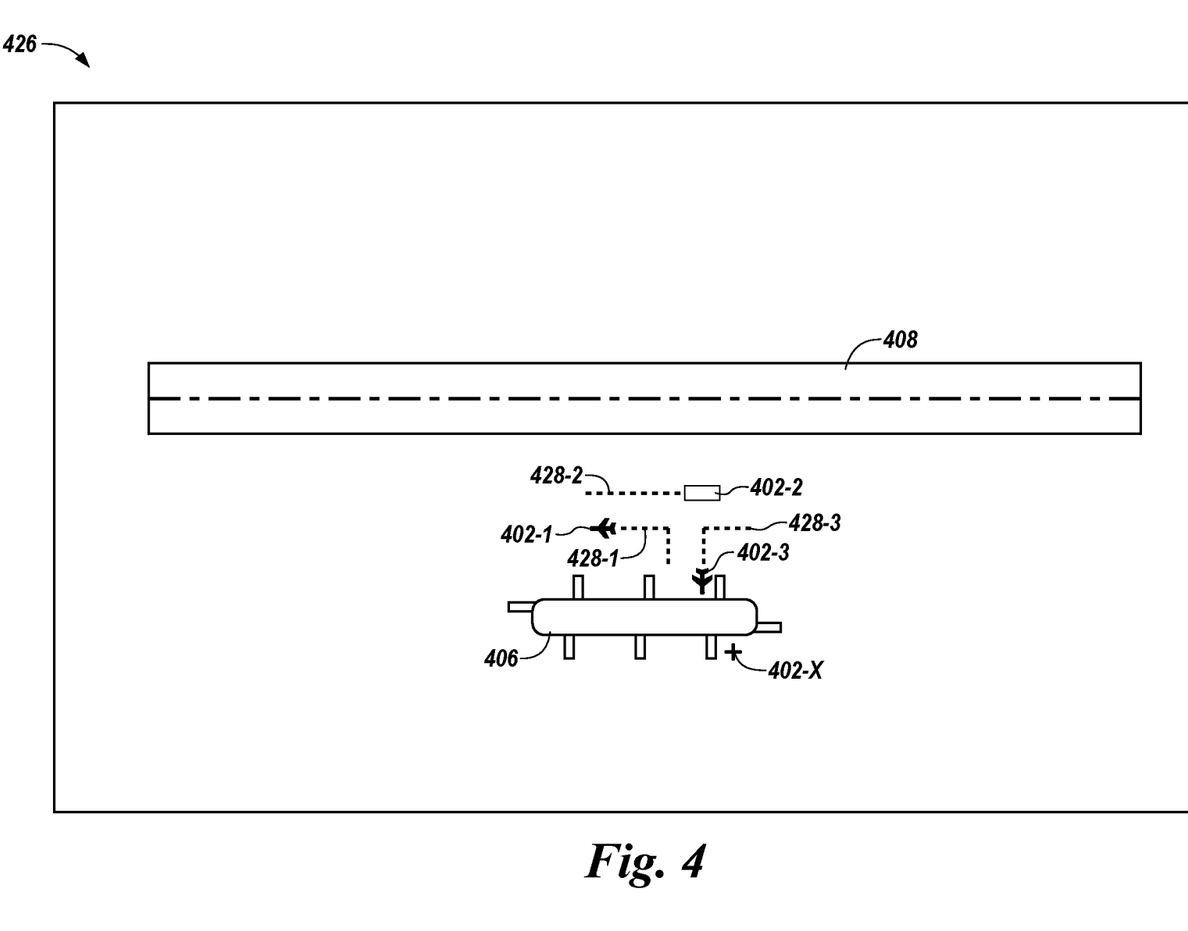
FIG. 4 illustrates a user interface for ground traffic management including a plurality of targets in accordance with an embodiment of the present disclosure.

FIG. 4 illustrates a user interface 426 for ground traffic management including a plurality of targets 402-1, 402-2, 402-3, . . . , 402-X in accordance with an embodiment of the present disclosure. User interface 426 can correspond to user interface 226 in FIG. 2 and the plurality of targets 402-1, 402-2, 402-3, . . . , 402-X can correspond to the plurality of targets 102-1, 102-2, 102-3, . . . , 102-X in FIG. 1. As previously described in connection with FIG. 2, user interface 426 can provide information to the user of a computing device (e.g., computing device 220 in FIG. 2), and/or receive information from the user of the computing device.

The plurality of targets 402-1, 402-2, 402-3, . . . , 402-X can be displayed at their respective positions, included in a current sensor report(s) (e.g., sensor reports 332, 632, and 932 in FIGS. 3, 6, and 9, respectively), on a map of the airport on the user interface 426. The map can also include the building 406, a runway 408 of the airport, and paths 428-1, 428-2, and 428-3 traveled by targets 402-1, 402-2, and 402-3, respectively, as illustrated in FIG. 4.

Targets 402-1 and 402-3 can be aircrafts determined to be valid targets and target 402-2 can be a vehicle determined to be a valid target. Accordingly, targets 402-1 and 402-3 can be displayed on the user interface 426 with an icon corresponding to an aircraft and target 402-2 can be displayed on the user interface 426 with an icon corresponding to a vehicle. Since targets 402-1, 402-2 and 402-3 are valid targets, their positions on the map correspond to (e.g., match) their respective paths 428-1, 428-2, and 428-3. For example, path 428-1 leads to the position of target 402-1, path 428-2 leads to the position of target 402-2, and path 428-3 leads to the position of target 402-3.

Target 402-X, responsive to being determined to be a false target, can be displayed differently than a valid target on the user interface 426. For example, a false target can be displayed in a particular color, highlighted, or displayed as a particular icon. In the example illustrated in FIG. 4, the false target 402-X is displayed on the user interface 426 as a plus sign. Displaying false targets different from valid targets allows ATC controllers to quickly view and analyze ground traffic, make routing decisions, and communicate the decisions to various targets. Since target 402-X is a false target, its position in the map does not correspond to a path.

Figure 5:
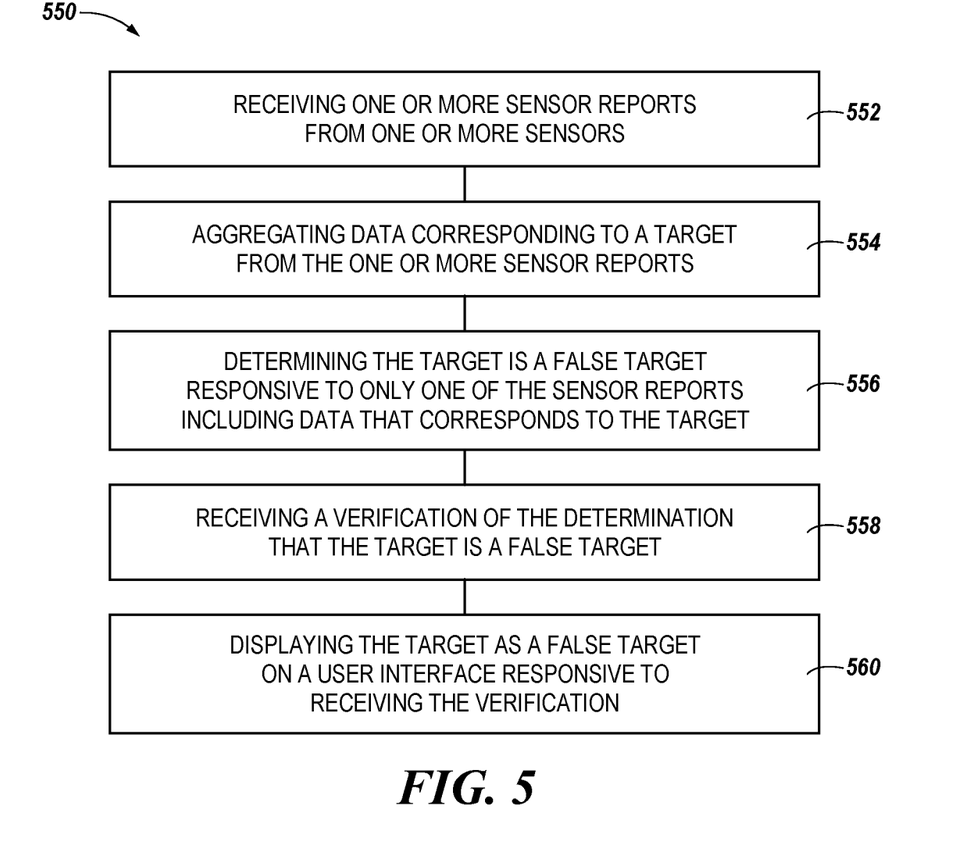
FIG. 5 illustrates an example method for false target detection in accordance with an embodiment of the present disclosure.

FIG. 5 illustrates an example method 550 for false target detection in accordance with an embodiment of the present disclosure. The method can be performed by, for example, computing device 220 previously described in connection with FIG. 2.

At block 552, the method 550 includes receiving one or more sensor reports (e.g., sensor reports 332, 632, and 932 in FIGS. 3, 6, and 9, respectively) from one or more sensors (e.g., sensor 104 previously described in connection with FIG. 1). The sensor reports can be one or more preceding sensor reports and/or current sensor reports, as previously described herein.

At block 554, the method 550 can include aggregating data corresponding to a target from the one or more sensor reports. For example, data related to a target can be grouped together. The aggregated data can include a target ID for the particular target, a position of the particular target, a position measurement time, and a velocity of the particular target, as previously described herein.

At block 556, the method 550 can include determining the target is a false target responsive to only one of the sensor reports including data that corresponds to the target. In some examples, a false target can be determined if the current sensor report is inconsistent with one or more preceding sensor reports, as previously described herein. For example, a particular target can be determined to be a false target responsive to the current sensor report including a position of the particular target that is inconsistent with a position of the particular target included in the one or more preceding sensor reports.

At block 558, the method 550 can include receiving a verification of the determination that the target is a false target. The verification of the determination that the target is a false target can be made by a human observer present at the airport and/or using camera footage of the airport. For example, a person with knowledge of the airport and/or knowledge of the sensors, such as an ATC controller, can verify false targets and/or valid targets. In some examples, the verified false targets and/or valid targets can be used as historical data.

The method can further include aggregating data corresponding to verified false targets from the one or more sensor reports, inputting the data corresponding to the verified false targets into an algorithm (e.g., algorithm 334 in FIG. 3), and outputting one or measurements from the algorithm. The one or more measurements can be inputted into a machine learning model (e.g., model 336 in FIG. 3) to determine an additional target is a false target.

At block 560, the method 550 can include displaying the target as a false target on a user interface responsive to receiving the verification. For example, a false target can be displayed in a particular color, highlighted, or displayed as a particular icon on the user interface, as previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for false target detection for airport traffic control, comprising:
    a user interface;
    a memory; and
    a processor configured to execute executable instructions stored in the memory to:
        store one or more preceding sensor reports from an antenna used for multilateration or two-dimensional position location in the memory;
        receive a current sensor report from the antenna used for multilateration or two-dimensional position location;
        aggregate data that corresponds to a particular target from the one or more preceding sensor reports and the current sensor report;
        determine current position of the particular target included in the current sensor report is inconsistent with a preceding position of the particular target included in the one or more preceding sensor reports responsive to a difference between the current position of the particular target included in the current sensor report and the preceding position of the particular target included in the one or more preceding sensor reports being greater than an expected error value;
        determine the particular target is a false target responsive to determining the current position of the particular target included in the current sensor report is inconsistent with the preceding position of the particular target included in the one or more preceding sensor reports; and
        display a map of an airport with one or more valid targets to allow an airport traffic controller to manage ground traffic at the airport on the user interface responsive to determining the particular target is a false target.

2. The computing device of claim 1, wherein the processor is configured to execute the instructions to display the false target in a particular color on the user interface.

3. The computing device of claim 1, wherein the data includes at least one of:
    a target identification (ID) for the particular target;
    the current position of the particular target;
    a position measurement time; and
    a velocity of the particular target.

4. The computing device of claim 1, wherein the particular target is an aircraft or a vehicle at the airport.

5. A non-transitory computer readable medium having computer readable instructions stored thereon that are executable by a processor to:
    store one or more preceding sensor reports from an antenna used for multilateration or two-dimensional position location in memory;
    receive a current sensor report from the antenna;
    aggregate data that corresponds to a particular target at an airport from the one or more preceding sensor reports and the current sensor report;
    determine a current position of the particular target included in the current sensor report is inconsistent with a preceding position of the particular target included in the one or more preceding sensor reports responsive to a difference between the current position of the particular target included in the current sensor report and the preceding position of the particular target included in the one or more preceding sensor reports being greater than an expected error value;
    determine the particular target is a false target responsive to determining the current position of the particular target included in the current sensor report is inconsistent with the preceding position of the particular target included in the one or more preceding sensor reports; and
    display a map of the airport with one or more valid targets and without the particular target to allow an airport traffic controller to manage ground traffic at the airport on a user interface responsive to determining the particular target is a false target.

6. The computer readable medium of claim 5, wherein the instructions are executable by the processor to determine the particular target is a valid target responsive to a plurality of the one or more preceding sensor reports and the current sensor report including data that corresponds to the particular target.

7. The computer readable medium of claim 6, wherein the instructions are executable by the processor to display the map of the airport with the particular target on the user interface responsive to determining the particular target is a valid target.

8. The computer readable medium of claim 5, wherein the instructions are executable by the processor to determine the expected error value for the current position of the particular target included in the current sensor report using an algorithm.

9. The computer readable medium of claim 8, wherein the instructions are executable by the processor to process historical position data using the algorithm.

10. The computer readable medium of claim 9, wherein the historical position data includes position data of one or more false targets and position data of the one or more valid targets.

11. The computer readable medium of claim 9, wherein the historical data includes a quantity of one or more false targets and a size of the one or more valid targets.

12. A computer implemented method for false target detection for airport traffic control, comprising:
    storing one or more preceding sensor reports from an antenna used for multilateration or two-dimensional position location in memory;
    receiving a current sensor report from the antenna;

aggregating data corresponding to a target from the one or more preceding sensor reports and the current sensor report;
determining a current position of the target included in the current sensor report is inconsistent with a preceding position of the target included in the one or more preceding sensor reports responsive to a difference between the current position and the preceding position being greater than an expected error value;
determining the target is a false target responsive to determining the current position of the target included in the current sensor report is inconsistent with the preceding position of the target included in the one or more preceding sensor reports;
receiving a verification of the determination that the target is a false target; and
displaying a map of an airport including the target as a false target differently from one or more valid targets to allow an airport traffic controller to manage ground traffic at the airport on a user interface responsive to receiving the verification.

13. The method of claim 12, further comprising:
aggregating data corresponding to verified false targets;
inputting the data corresponding to the verified false targets into an algorithm; and
outputting one or more measurements from the algorithm.

14. The method of claim 12, wherein the verification of the determination that the target is a false target is made using camera footage.

15. The method of claim 13, further comprising inputting the one or more measurements into a machine learning model.

16. The method of claim 15, further comprising using the machine learning model to determine an additional target is a false target.

* * * * *